United States Patent [19]

Iwanami

[11] Patent Number: 4,763,612
[45] Date of Patent: Aug. 16, 1988

[54] INTAKE SYSTEM FOR INTERNAL COMBUSTION ENGINE

[75] Inventor: Takeshi Iwanami, Hamakita, Japan

[73] Assignee: Yamaha Hatsudoki Kabushiki Kaisha, Iwata, Japan

[21] Appl. No.: 22,397

[22] Filed: Mar. 6, 1987

[30] Foreign Application Priority Data

Mar. 10, 1986 [JP] Japan .................................. 61-50444

[51] Int. Cl.$^4$ ............................................. F02B 75/18
[52] U.S. Cl. ............................................. 123/52 MV
[58] Field of Search .......... 123/52 M, 52 MV, 52 MB

[56] References Cited

U.S. PATENT DOCUMENTS

| | | |
|---|---|---|
| 1,763,726 | 6/1930 | Timian . |
| 1,890,567 | 12/1932 | Baverey . |
| 2,126,649 | 8/1938 | Lytle et al. . |
| 2,172,957 | 9/1939 | Firth . |
| 2,315,215 | 3/1943 | Maybach . |
| 2,323,442 | 7/1943 | Beard . |
| 2,766,743 | 10/1956 | Platner et al. . |
| 2,862,490 | 12/1958 | Trisler . |
| 2,916,027 | 12/1959 | Chayne et al. . |
| 2,935,053 | 5/1960 | Brueder ............... 123/52 M |
| 3,146,764 | 11/1964 | Elsbett . |
| 3,370,575 | 2/1968 | Soubis . |
| 3,441,008 | 4/1969 | Nelson . |
| 3,491,735 | 1/1970 | Soubis . |
| 3,796,048 | 3/1974 | Annus et al. . |
| 3,814,069 | 6/1974 | Croft et al. ........... 123/52 M |
| 3,943,906 | 3/1976 | Hirose et al. . |
| 4,030,459 | 6/1977 | Hori et al. . |
| 4,300,488 | 11/1981 | Cser . |
| 4,353,211 | 10/1982 | Cser et al. . |
| 4,510,896 | 4/1985 | Rutschmann . |
| 4,549,506 | 10/1985 | Rush, II et al. ............... 123/52 MB |
| 4,622,926 | 11/1986 | Rutschmann et al. ........ 123/52 MB |

FOREIGN PATENT DOCUMENTS

| | | |
|---|---|---|
| 647884 | 7/1937 | Fed. Rep. of Germany ... 123/52 M |
| 2145372 | 3/1972 | Fed. Rep. of Germany ... 123/52 M |
| 0054627 | 4/1980 | Japan ............... 123/52 M |
| 56-115818 | 9/1981 | Japan ............... 123/52 MB |
| 0110765 | 7/1982 | Japan ............... 123/52 M |
| 0093929 | 6/1983 | Japan ............... 123/52 M |
| 0043923 | 3/1984 | Japan ............... 123/52 M |
| 0090935 | 5/1985 | Japan ............... 123/52 M |
| 127850 | 1/1919 | United Kingdom .......... 123/52 MB |
| 2135388 | 8/1984 | United Kingdom ............ 123/52 M |

Primary Examiner—Charles J. Myhre
Assistant Examiner—David A. Okonsky
Attorney, Agent, or Firm—Ernest A. Beutler

[57] ABSTRACT

An improved induction system for a V type engine that is tuned for substantially all running conditions and which is nevertheless compact in construction. The system includes a pair of plenum chambers each disposed adjacent one of the cylinder heads of the engine. Each cylinder head has at least two intake passages serving the respective cylinder bores and a first conduit extends from the adjacent plenum chamber to one of the intake passages and a second conduit extends from the other of the plenum chambers to the other intake passage. The plenum chambers communicate with each other at their opposite ends to improve air flow and a common inlet opening serves each plenum chamber inlet. A throttle valve arrangement is also incorporated so that good performance is achieved under all running conditions.

14 Claims, 5 Drawing Sheets

4,763,612

INTAKE SYSTEM FOR INTERNAL COMBUSTION ENGINE

BACKGROUND OF THE INVENTION

This invention relates to an intake system for an internal combustion engine and more particularly to an intake system that improves the performance throughout the entire engine load and speed ranges.

In connection with engine induction systems, it has been a practice to employ a plenum chamber between an atmospheric air inlet and the chamber or chambers of the engine which are served. The use of plenum chambers tems to dampen pulsations in the intake charge flow and improves the charging efficiency of the engine. However, if a sufficient inlet opening is not provided into the plenum chamber, high power outputs may be restricted.

It has been proposed to provide a system wherein the plenum chamber is provided with a plurality of air intakes. However, where a plurality of air intakes are incorporated, the performance at mid-ranges may not be as good as desired. In order to improve mid-range performance, it has been proposed to incorporate some form of throttle valve arrangement for controlling the flow into the plenum chamber through the air intakes. However, the throttle valving arrangement should preferably be compact, simple and permit the desired tuning of the intake system.

It is, therefore, a principal object of this invention to provide an improved intake system for an internal combustion engine.

It is further object of this invention to provide an engine intake system including a plenum chamber with plural atmospheric air inlets and an improved throttle valve arrangement for controlling the flow through these inlets.

There have also been proposed intake systems for internal combustion engines that include compound or staged intake passages serving each combustion chamber of the engine. In this way, the individual intake passages may be tuned so as to perform improved performance under specific running conditions. These systems also can advantageously make the use of plenum chambers and copending application Ser. No. 634,795 and now U.S. Pat. No. 4,649,876, filed July 26, 1984, in the names Masatoshi Ohmi et al, entitled "Intake Means Of Internal Combustion Engine", and assigned to the assignee of this invention relates to one such system. A further improvement of this type of induction system including plural air inlets to the plenum air inlets to the plenum chamber is shown in copending application Ser. No. 002,730, filed Jan. 14, 1987, in the names of Iwao Masumoto et al, entitled "intake system For Multi Cylindered Engine", and assigned to the assignee of this invention.

It is a further object of this invention to provide an improved induction system of this type including a throttle valve arrangement for controlling the flow to the plenum chambers through the separate atmospheric air inlets.

It is a further object of this invention to provide an induction system of this type wherein a simple but effective throttle valve control is provided for the individual air inlets of the plenum chambers.

SUMMARY OF THE INVENTION

A first feature of this invention is adapted to be embodied in an induction system for an internal combustion engine that comprises at least one variable volume chamber having at least one intake port for delivering a charge thereto. A plenum chamber is incorporated and at least one intake passage extends from the plenum chamber to the intake port. First and second inlet passages extend into the plenum chamber. The first and second inlet passages merge into a common atmospheric air inlet. A first throttle valve is positioned in the common atmospheric air inlet for controlling the air flow through both of the first and second inlet passages and a second throttle valve is positioned in the first inlet passage for controlling the flow only therethrough.

Another feature of the invention is adapted to be embodied in an induction system for an internal combustion engine having at least two cylinders and first and second plenum chambers. Conduit means deliver a charge from the plenum chambers to the cylinders for induction thereto. In accordance with this feature of the invention, first and second inlet passages extend into each plenum chamber. The first and second inlet passages for each plenum chamber merge into a common atmospheric air inlet. A first throttle valve is positioned in the common atmospheric air inlet of each plenum chamber for controlling the flow through both of its first and second inlet passages and a second throttle valve is positioned only in the first inlet passage for controlling the flow therethrough.

DETAILED DESCRIPTION OF THE PREFERRED EMBODIMENTS

Figure 1:
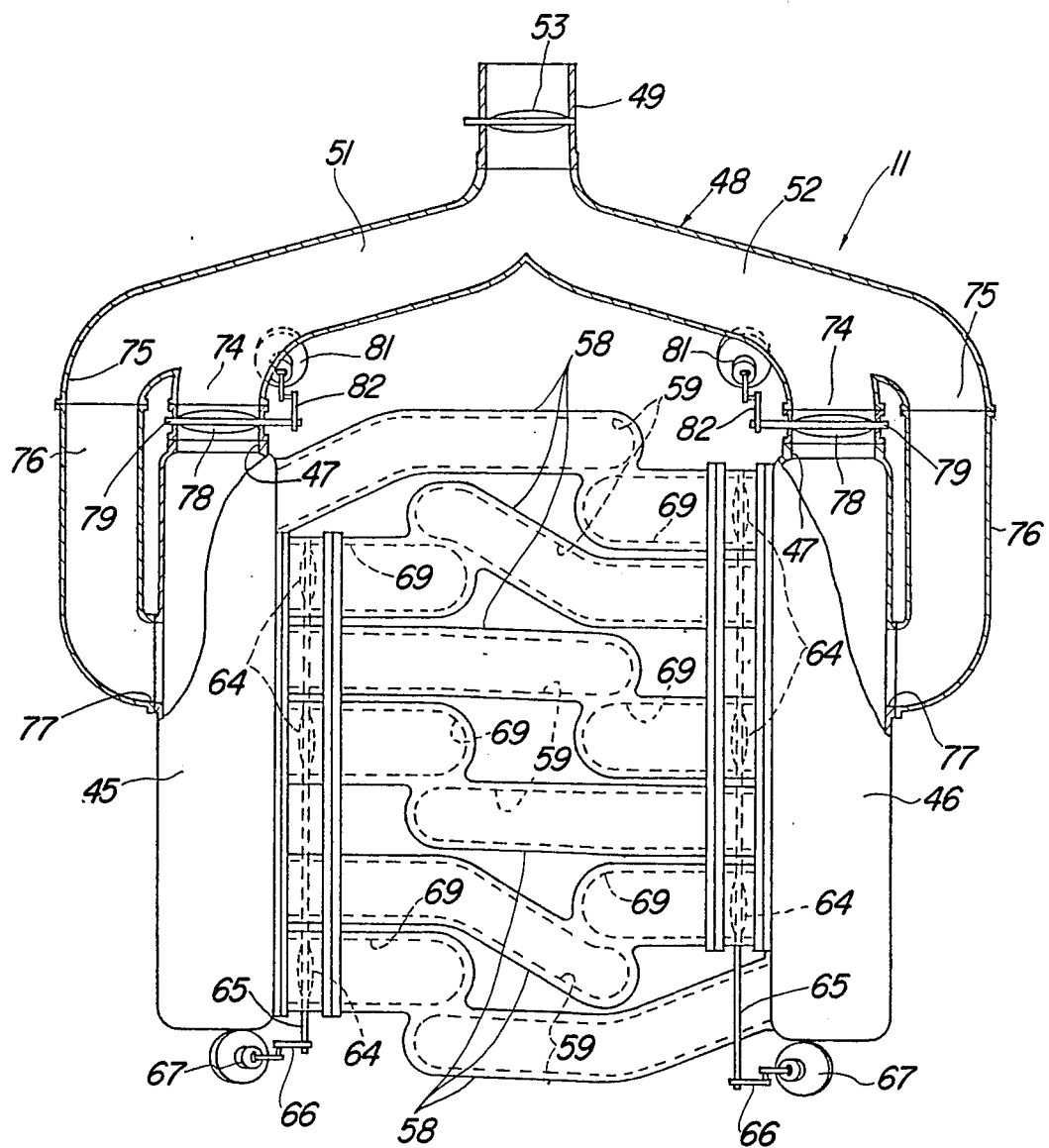
FIG. 1 is a top plan view, with portions broken away, of an internal combustion engine construction in accordance with a first embodiment of the invention.
Figure 2:
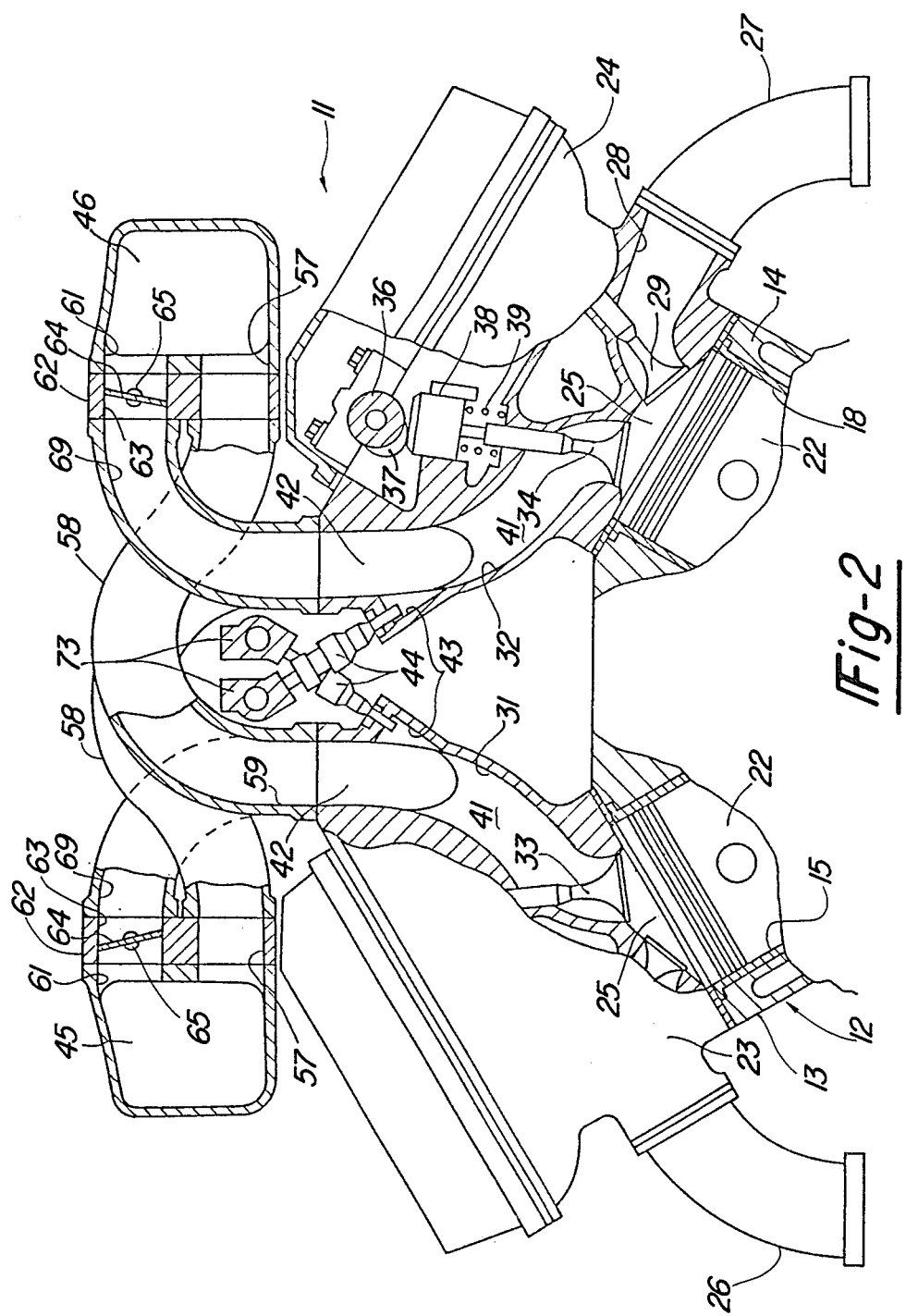
FIG. 2 is an end elevational view, with portions broken away and shown in section, of the engine of FIG. 1.
Figure 3:
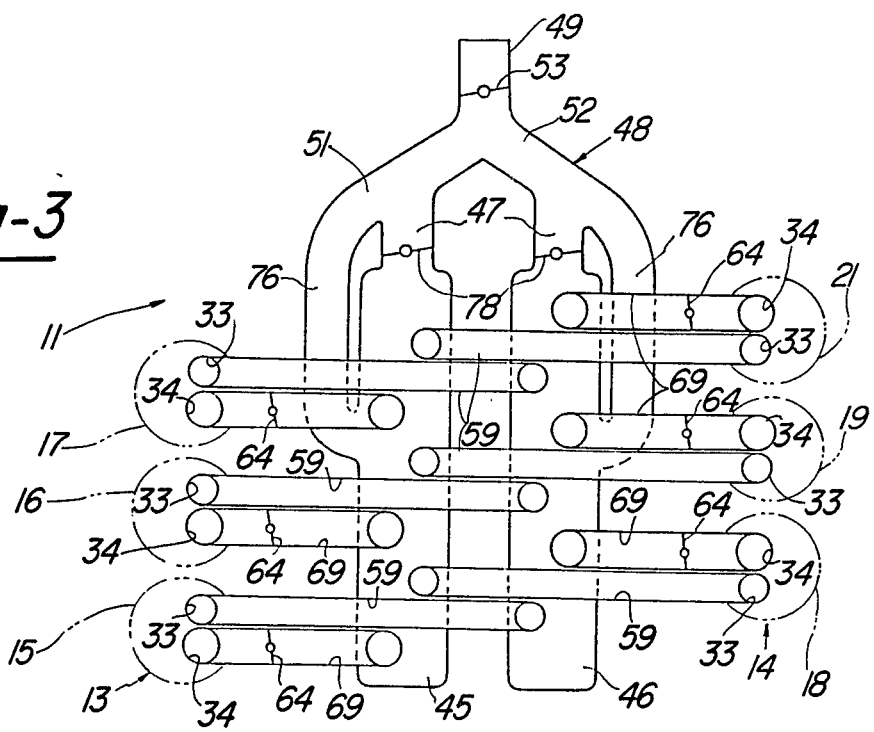
FIG. 3 is a schematic top plan view showing the induction system of the embodiment of FIGS. 1 and 2.

Referring first to the embodiment of FIGS. 1 through 3, the reference numeral 11 indicates generally an internal combustion engine constructed in accordance with an embodiment of the invention. In the illustrated embodiment, the engine 11 is of the "V" type and includes a cylinder block 12 having angularly inclined banks 13 and 14. In the illustrated embodiment, the engine 11 is of the V6 type and each cylinder bank 13 and 14 defines three cylinder bores, as will be described. The cylinder bores of the bank 13 are disposed at an angle to those of the bank 14 and in the illustrated embodiment, this angle is 60°. It is to be understood, however, that the invention and certain facets of it are useful with engine of other configurations and engines in which the angle between the banks is other than 60°. The invention, however, has particular utility in conjunction with V type engines and particularly those in which a very narrow or relatively shallow cylinder bank angle is employed.

The cylinder bank 13 is provided with three cylinder bores, as has been noted, which cylinder bores are shown as circles in FIG. 3 and are identified by the respective numerals 15, 16, and 17. In a like manner, the cylinder bank 14 is also formed with three cylinder bores which are shown in circles and which are identified by the reference numerals 18, 19 and 21. Pistons 22 (FIG. 2) are reciprocally supported in each of the cylinder bores 15 through 19 and 21 and are connected to a crankshaft (not shown) in a known manner as by means including connecting rods.

A cylinder head, indicated generally by the reference numeral 23, is affixed in a known manner to the cylinder bank 13. In a like manner, a cylinder head, indicated generally by the reference numeral 24, is affixed to the cylinder bank 14. Each cylinder head 23 and 24 has a recessed cavity 25 formed therein for each of the cylinder bores. The cavities 25, pistons 22 and cylinder bores 15 through 19 and 21 form the combustion chambers of the engine and the reference numerals 25 will be, at times, referred to as the combustion chambers.

The combustion chambers 25 are generally hemispherical in shape and each chamber is provided with a pair of exhaust passages formed in the respective cylinder head 23 or 24 which extend from the chambers 25 and which are adapted to cooperate with respective exhaust manifolds 26 and 27. These exhaust passages are identified by the reference numeral 28 and are shown only in FIG. 2. Exhaust valves 29 are reciprocally supported in each of the cylinder heads 23 and 24 and control the communication of the cylinder head exhaust passages 28 with the combustion chambers 25. The exhaust valves 29 associated with each cylinder bore 15 through 19 and 21 are operated in unison in a suitable manner as by means of an overhead mounted camshaft (not shown).

On the opposite sides of the hemisphere from the exhaust valves 29, the cylinder heads 23 and 24 are provided with a pair of intake passages 31 and 32 for each chamber 25. The passages 31 terminate at an intake valve 33 while the passages 32 terminate at an intake valve 34. The portion of the passages 31 and 32 which extend through the respective cylinder heads 23 and 24 are substantially identical in construction and they each terminate in a generally horizontally extending surface 35 of the respective cylinder head. The passages 31 may, if desired, have a smaller effective cross-sectional area than the passages 32.

The intake valves 33 and 34 are, like the exhaust valves 29, operated by means of respective overhead mounted camshafts 36, each supported for rotation in the respective cylinder head 23 and 24 in a known manner. The intake camshafts 36 have lobes 37 that cooperate with thimble tappets 38 so as to operate the valves 33 and 34 in a known manner. Coil compression springs 39 are provided for urging the valves 33 and 34 toward their closed positions.

As may be readily seen from FIG. 2, the cylinder head intake passages 31 and 32 are separated from each other by a boundary wall 41 that extends from the valve seats and for a portion of the length of the passages 31 and 32. However, this wall terminates short of the cylinder head face 35 so as to provide an open area 42 of limited length through which the passages 31 and 32 may communicate with each other, for a reason to be disclosed. In this communicating area 42, each cylinder head is provided with a recess 43 (FIG. 2) into which a fuel injection nozzle 44 extends. The nozzles 44 discharge in the downstream direction and because of their central placement, there will be good fuel distribution balance between the intake passages 31 and 32.

The induction system for the engine 11 further includes a first plenum chamber 45 that is juxtaposed to the positioned above the cylinder head 23 of the cylinder bank 13. A second, generally similar plenum chamber 46 is disposed adjacent and immediately above the cylinder head 24 of the cylinder bank 14. The plenum chambers 45 and 46 have inlet openings 47 at their forward ends which receive atmospheric air from an intake device, indicated generally by the reference numeral 48 and which has a generally Y shape in top plan. The intake device 48 has a common throat portion 49 from which branches 51 and 52 extend to the respective plenum chambers 45 and 46. A manually operated throttle valve 53 is supported in the throat 49 and is connected by a suitable linkage to the operator control for controlling the air flow into the induction system. A suitable air cleaner (not shown) is positioned upstream of the throat device 49 for filtering the intake air and for achieving such silencing as may be desired.

The lower portion of each plenum chamber 45 and 46 is provided with respective outlet openings 57, there being one such opening 57 for each cylinder of one bank of the engine. The openings 57 communicate with elongated conduits 58 which have internal passages 59 and which extend from each opening 57 to an induction passage 31 of the opposing cylinder bank. That is, the plenum chamber 45 serves the intake passages 31 of the cylinder head 24 while the plenum chamber 46 serves the intake passages 31 of the cylinder head 23. As a result, a relatively long air flow path is provided which gives the opportunity to insure laminar flow through the induction system so that the passages consisting of the plenum chambers 45 or 46, passages 59 and cylinder head intake passages 31 may be tuned so as to give good running characteristics at low and mid-range running.

Each plenum chamber 55 is also provided with a plurality of outlet openings 61, there being one such opening for each cylinder of one bank of the engine. The openings 61 communicate with respective valve bodies, indicated generally by the reference numberal 62, which are affixed in a suitable manner to the plenum chambers 45 and 46. The valve bodies 62 have a number of passages 63 that are equal in number to the openings 61 and which directly communicate with these openings. Throttle valves of the butterfly type 64 are supported in each of the valve body openings 63 on a common throttle valve shaft 65. In this way, the throttle valves 64 associated with plenum chambers 45 and 46 will be operated in unison.

At one end of the engine 11, the throttle valve shafts 65 are extended and are connected by means of a respective linkage system 66 to a respective vacuum motor 67. The vacuum motors sense induction system vacuum downstream of the throttle valve 64. The construction and operation of the vacuum motors 67 are such that the throttle valves 65 will be held in their closed position until induction system pressure increases (manifold vacuum decreases) so as to indicate that the engine has approached its maximum power output or power demand condition. Then the valves 64 will be opened.

The valve body induction passages 63 communicate with induction passages 69 that each extend to the intake passages 32 of the adjacent cylinder head. Hence, the plenum chamber 45 serves the intake passages 32 of the cylinder head 23 while the plenum chamber 46 serves the intake passages 32 of the cylinder head 24. Hence, these intake passages can be kept very short to permit tuning for maximum power output.

It should be noted that the conduit passages 59 and 69 serving the intake passages 32 and 31, respectively, are separated from each other by respective walls. Hence, there is only a relatively short area of open communication (the area 42) between the respective conduits serving the cylinder head intake passages 31 and 32. This short but nevertheless open communication has been found to be extremely important in assuring good running during transition from mid-range to wide open performance.

In addition to having a common throttle valve 53 that controls the flow of intake air to the plenum chambers 45 and 46, the intake device 48 is also provided with a single flow sensor (not shown), which may be of vane type, and which senses the air flow into the induction system. This sensor is connected through a suitable control system for controlling the amount of flow delivered to the injection nozzles 44 through a pair of fuel manifold 73 that are disposed in proximity to the cylinder heads 23 and 24 and injection nozzles 44. The specific construction for controlling the fuel flow may be of any known type.

The operation of the induction system as thus far detailed will now be described. During low speed running, the manually operated common throttle valve 53 will be operated under the operator's control and will be opened only to a small degree. There will be a relatively high induction system vacuum exerted on the vacuum motors 67 so as to hold the throttle valves 64 in their closed positions. Hence, substantially all of the induction air for the engine will be supplied through the inlet device 48 to the plenum chambers 45 and 46 and specifically to their outlets 57. This air is transferred from the plenum chamber 45 through the relatively long conduits 58 and passages 59 to the induction passages 31 of the cylinder head 24. In a like manner, the plenum chamber 46 will serve the induction passages 31 of the cylinder head 23. Hence, as has already been noted, a relatively long air path is provided that will insure laminar flow. However, the air flow will flow through a relatively small cross-sectional area of the total induction system area serving each cylinder bore 15 through 19 and 21 so that the induction will be at a high velocity. This will insure a rapid rate of flame propagation in the chambers which insures that there will be good combustion.

As the load on the engine increases and the manually operated throttle valve 53 is progressively opened, there will be a good point when the passages 31 cannot supply the full charge requirements of the combustion chambers 25. This occurs at a point before that at which the throttle valves 64 are opened. At this point, induction charge may flow through the communicating area 42 to enter the chambers 25 through both the induction passages 31 and 32 and intake valves 33 and 34 of the cylinder head. As has been previously noted, this communication provides significantly improved mid-range performance since it eliminates or substantially reduces the dip which would otherwise occur in the torque curve of the engine at this point.

As the load continues to increase, and the throttle valve 53 is progressively opened, the induction system vacuum will eventually reach a point where the vacuum motors 67 no longer hold the control valves 64 in their closed position and these valves will open. Thus, the effective area of the induction system serving each cylinder bore 15 through 19 and 21 will substantially increase and a very good maximum output can be achieved. Furthermore, as has been noted, the passages 69 which serve the intake ports 32 are relatively short and will offer low flow resistance and may be tuned so as to achieve the desired flow under this running condition.

The construction as thus far described may be considered to be substantially the same as that described in co-pending application Ser. No. 634,795. In accordance with this type of construction, even though the overall performance has been found to be improved significantly from conventional prior art engines, it is believed there can be further improvement.

As is noted in copending application Ser. No. 002,730, it has been found that the torque can be improved by improving the breathing capacity of the individual plenum chambers 45 and 46. The vacuum existing in the plenum chambers 45 and 46 has been found to increase under mid-range running. This is believed to exist due to restrictions in the air flow into the plenum chambers 45 and 46 and also because of reverse flow which has been found to occur in the plenum chambers under this condition. That is, there is some interference between the flow to the individual cylinders served by the plenum chamber passages 57 under this running condition. In accordance with this invention, an arrangement is provided for incorporating an additional air intake into each of the plenum chambers 45 and 46 which has been found to significantly improve performance under this running condition without adversely effecting the running under other conditions.

As is noted in copending application Ser. No. 002,730, the performance can be improved by incorporating an additional air inlet to each of the plenum chambers 45 and 46. However, it has been found that the mere addition of such an additional air inlet, although it improves the maximum power output of the engine, can result in less than satisfactory performance under part speed running. It has been found desirable to include a throttle valve arrangement for controlling the flow through the additional air inlets so as to improve this part speed running condition.

In accordance with the invention, the inlet device 48 has a pair of first branch passages 74 that extend from the common air inlet 49 to the forwardly positioned air inlet openings 47 of the respective plenum chambers 45 and 46. In addition, the intake device 48 is provided with a branched pair of outlet openings 75 which extend parallel to the openings 74 and which may have a smaller effective cross-sectional rea.

The inlet device outlet openings 75 cooperate with air intake tubes 76 that extend to openings 77 formed in the side walls of the respective plenum chambers 45 and 46 at approximately their mid-points. The length of the passages 76 may be adjusted so as to provide suitable tuning for the induction system. Specifically, the length and cross-sectional area may be tuned to suit the low speed running characteristic, which is the condition under which the passages 76 supply the inlet to the plenum chambers 45 and 46.

As has been noted above, the mere provision of the additional air inlets to the plenum chambers 45 and 46 will provide an improved maximum power output. As has also been noted, however, the addition of these inlets can provide less than satisfactory running under mid-range conditions unless some form of control is provided. This condition can be best understood by reference to FIG. 6 which is a torque speed curve of engines having only the plenum chambers inlets 47 (curve $P_1$) and an engine having additionally the openings 77 ($P_2$). It will be seen that the torque curve $P_1$ reaches its peak at an engine speed $N_1$ and then falls off due to the restricted air inlet flow. The addition of the opening 77 causes the torque curve $P_2$ to result which has its maximum torque at a higher engine speed $N_2$ and which permits a higher total power output for the engine. However, there is a valley V in the torque curve between the engine speeds $N_1$ and $N_2$ and this valley can occur at normal highway cruising speeds with an automotive type vehicle powered by such an engine.

In order to overcome this valley in the torque curve, the inlet device passages 74 are each provided with respective flow controlling throttle valves 78. The throttle valves 78 are fixed to throttle valve shafts 79 which are journaled within a valve body positioned between the inlet device 48 and the plenum chambers 45 and 46. A vacuum motor 81 is coupled to each of the throttle valve shafts 79 by means of a linkage system 82 for operating the throttle valves 78. The vacuum motors 81 may be controlled in a suitable manner but are specifically designed so as to operated in response to a predetermined engine speed.

Figure 7:
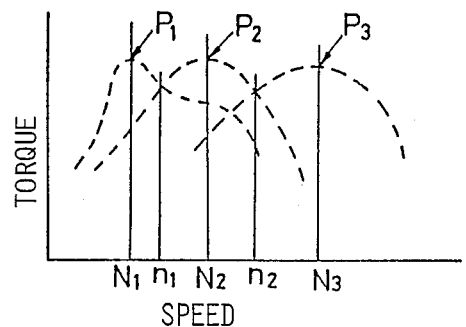
FIGS. 7 and 8 are torque, speed curves showing how the embodiment of FIGS. 1 through 3 and 4 operate.

FIG. 7 is a torque curve showing how the controlling of the throttle valves 78 and 64 may be interrelated so as to improve the mid-range torque and to avoid or significantly reduce the valley which occurs with the prior art type of constructions. In this figure, the torque curve $P_1$ is the torque curve that occurs when both the throttle valves 78 and 64 are closed. The curve $P_2$ shows the torque curve that results when the throttle valves 78 are opened and the throttle valves 64 are closed. The torque curve $P_3$ shows the torque curve that is achieved when both the throttle valves 78 and 64 are held fully opened.

Figure 6:
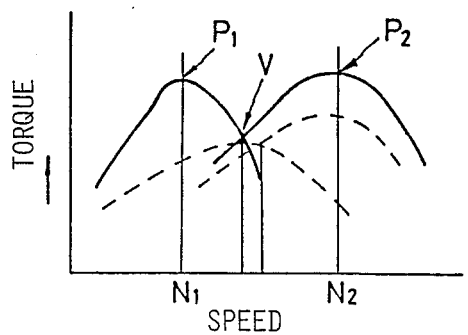
FIG. 6 is a torque, speed curve of an engine constructed in accordance with the prior art.

As may be seen, the torque curve increases along the curve $P_1$ until it reaches a peak at the engine speed $N_1$. The torque curve then falls off and at the point $n_1$, the throttle valves 78 are opened so as to provide additional air flow into the plenum chambers 45 and 46. The torque then again increases up to the maximum torque curve at the speed $N_2$ and then again begins to fall off. At the point $n_2$, the throttle valves 64 are opened and the torque again raises and follows the curve $P_3$. Therefore, it will be seen that although there are some slight valleys in the torque curve that it is a substantially better torque curve than existent with the prior art type of construction as shown in FIG. 6.

Figure 8:
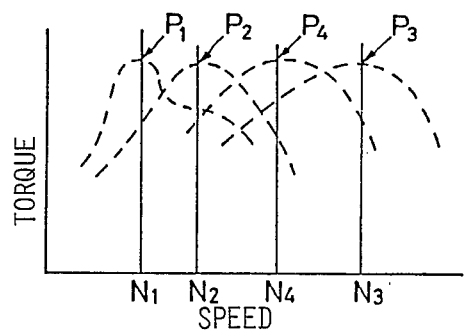

FIG. 8 shows another arrangement whereby the throttle valve openings may be controlled so as to further improve the torque curve of the engine. In this view, the curve $P_4$ is a torque curve that occurs when the throttle valves 64 are maintained in an opened condition and the throttle valves 78 are closed. Therefore, by reclosing the throttle valves 78 and opening the throttle valves 64 at mid range performance, there can be a further improvement in the running of the engine.

Figure 4:
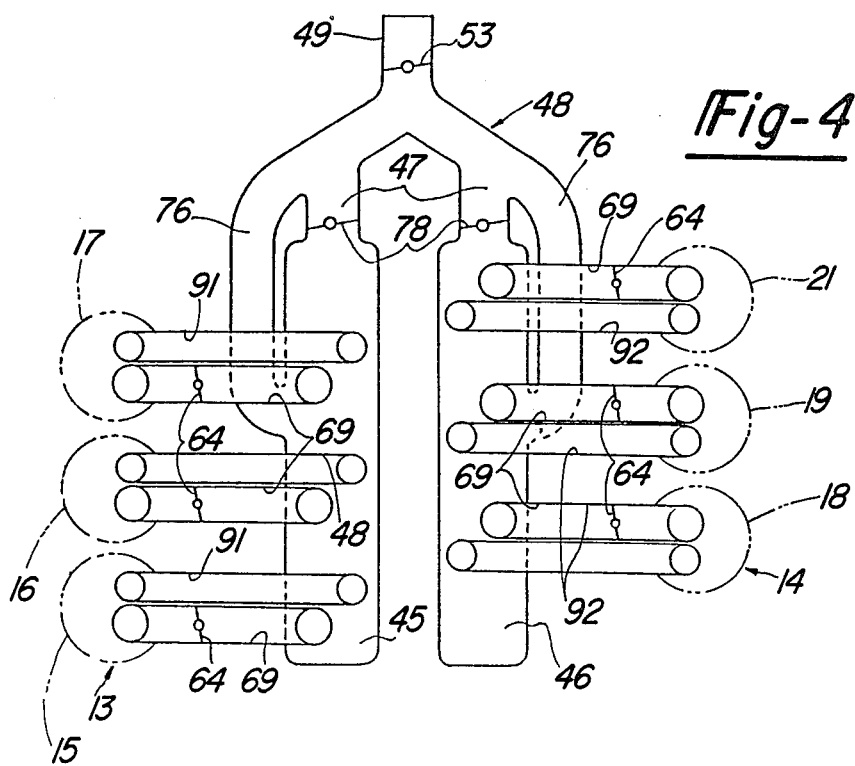
FIG. 4 is a top plan view, in part similar to FIG. 3, showing another embodiment of the invention.

In the embodiment of the invention thus far illustrated and described, the variable length of the individual intake passages serving the individual cylinders was obtained by serving one intake passage from the plenum chamber 45 and the other intake passage from the plenum chamber 46 for each cylinder. FIG. 4 shows another embodiment wherein the different length passages are achieved in a different manner so as to provide a simpler manifolding arrangement.

Referring now specifically to this embodiment, the only difference between this embodiment and the previously described embodiment has to do with the configuration and location of the slow speed intake passages for each cylinder. For this reason, those components which are the same as those of the previously described embodiment have been identified by the same reference numeral and will not be described, except insofar as is necessary to understand the construction and operation of this embodiment.

In this embodiment, there are provided relatively long induction passages 91 that extend from the plenum chamber 45 to the cylinders 15, 16 and 17 of the adjacent cylinder bank. These longer induction passages 91 are formed by having them enter into the plenum chamber 45 at a different axial location than the passages 69 or by curving them or both so that the passages 91 have a substantially longer effective length than the passages 69.

In a similar manner, there are provided long passages 92 that interconnect the plenum chamber 46 with the cylinders 18, 19 and 21. Again, these passages may be made longer than the passages 69 through any appropriate expedient.

In the embodiments of the invention as thus far described, there have been provided two separate intake passages of differently tuned length for each combustion chamber. However, certain facets of the invention also have application with engines having only a single induction passage serving each combustion chamber and FIG. 5 shows such an embodiment.

In this embodiment, the construction of the plenum chambers 45 and 46 and their inlets as well as the basic construction of the individual cylinders 15, 16, 17, 18, 19 and 21 is the same as the previously described embodiment. Therefore, all components which are the same as the previously described embodiment have been identified by the same reference numerals and will not be described again, except insofar as is necessary to understand the construction and operation of this embodiment.

In this embodiment, each of the cylinders 15 through 19 and 21 is provided with a single intake port 101. The intake ports 101 of the cylinders 15, 16 and 17 are served by respective runners 102 that extend from the plenum chamber 45 and which terminate at the intake ports 101. In a like manner, runners 103 extend from the plenum chamber 46 to the intake ports 101 of the cylinders 18, 19 and 21. The runners 102 and 103 may be formed in the respective cylinder heads and in intake manifolds (not shown) and also by means of the plenum chambers 45 and 46 per se.

Figure 5:
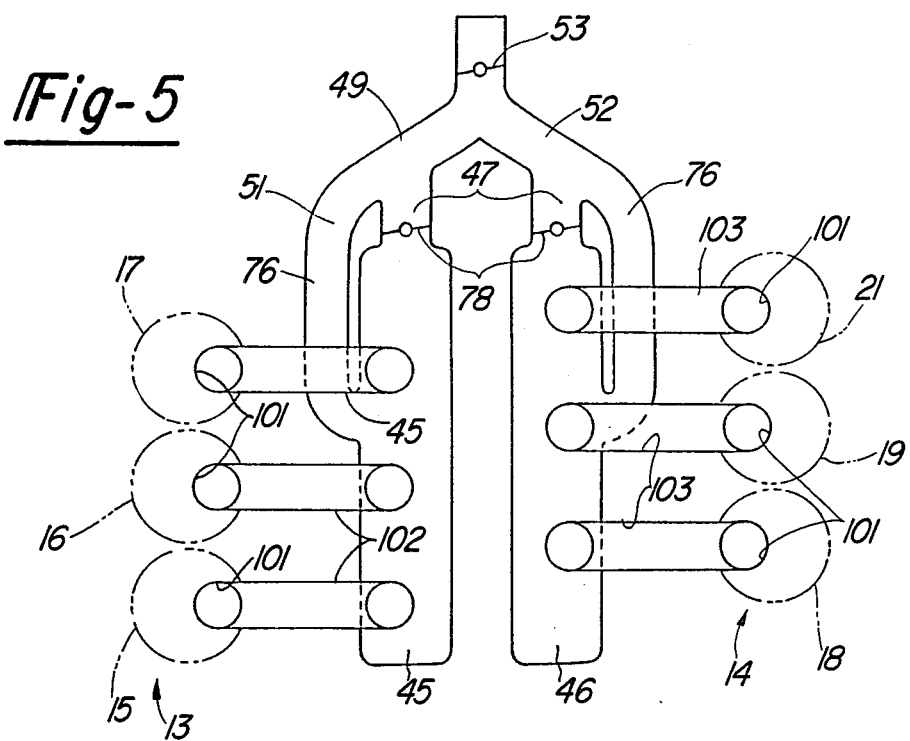
FIG. 5 is a schematic top plan view, in part similar to FIGS. 3 and 4, showing a further embodiment of the invention.
Figure 9:
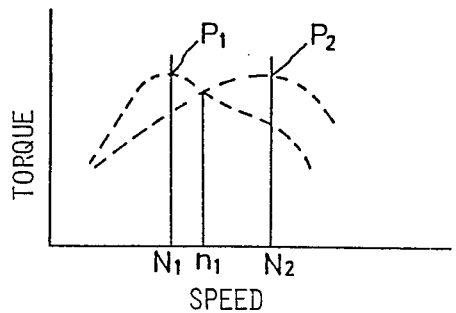
FIG. 9 is a torque, speed curve showing the operation of the embodiment of FIG. 5.

FIG. 9 shows the torque speed curve for an engine constructed in accordance with the embodiment of FIG. 5. The curve $P_1$ shows the torque curve when the throttle valves 78 are maintained in a fully closed position. It will be noted that the torque curve under this condition rises to a peak $P_1$ at the engine speed $N_1$ and then falls off. However, by opening the throttle valves 78 at the point $n_1$, then the torque curve will follow the curve $P_2$ and a flatter torque curve and greater power output is possible.

It should be readily apparent from the foregoing description that a number of embodiments of the invention have been illustrated and described each of which provides very good running for the engine throughout its entire speed and load ranges. In addition, by providing a pair of inlets for each of the plenum chambers, the inlets may be tuned so as to satisfy different running conditions and, furthermore, the overall performance of the engine can be improved. Although a number of embodiments of the invention have been illustrated and described, various other changes and modifications may be made without departing from the spirit and scope of the invention, as defined by the appended claims.

What is claimed is:

1. An induction system for an internal combustion engine comprising at least one variable volume chamber having at least one intake port for delivering a charge thereto, a plenum chamber, at least one intake passage extending from said plenum chamber to said intake port, a first inlet passage extending into said plenum chamber, a second inlet passage extending into said plenum chamber, said first and said second inlet passages merging into a common atmospheric air inlet, a first throttle valve in said common atmospheric air inlet for controlling the flow through both of said first and said second inlet passages, and a second throttle valve positioned in said first inlet passage for controlling the flow therethrough.

2. An induction system as set forth in claim 1 wherein the throttle valves are operated in a staged sequence.

3. An induction system as set forth in claim 2 wherein the first throttle valve is opened before the second throttle valve is opened.

4. An induction system as set forth in claim 1 wherein the first and second inlet passages have different effective lengths entering into the respective plenum chamber.

5. An induction system as set forth in claim 1 wherein a second intake passage extends from the plenum chamber to the variable volume chamber.

6. An induction system as set forth in claim 5 wherein the first mentioned intake passage and the second intake passage have different effective lengths.

7. In an induction system for an internal combustion engine having at least two cylinders, a first plenum chamber, a second plenum chamber, conduit means for delivering a charge from said plenum chambers to said cylinders for induction thereto, the improvement comprising a pair of first inlet passages, each one of said pair extending into a respective one of said plenum chambers, a pair of second inlet passages, each of said second pair extending into a respective one of said plenum chambers, said first and said second inlet passages of each plenum chamber each merging into a respective common atmospheric air inlet throttle valve means for controlling the flow into each of said plenum comprising a first throttle valve in said common atmospheric inlet for controlling the flow through both of said first and said second inlet passages and a second throttle valve positioned in said first inlet passage for controlling the flow therethrough.

8. In an induction system as set forth in claim 7 wherein the first and second inlet passages of each of the plenum chambers merge into the same common atmospheric air inlet.

9. In an induction system as set forth in claim 8 wherein the first throttle valve means controls the flow through the first and second inlet passages of all of the plenum chambers and the second throttle valve means controls the flow only through the first inlet passages of the respective plenum chambers.

10. In an induction system as set forth in claim 9 wherein the second throttle valve means comprises a pair of throttle valves.

11. In an induction system as set forth in claim 10 wherein the throttle valves are operated in a staged sequence.

12. An induction system as set forth in claim 11 wherein the first throttle valve is opened before the second throttle valve is opened.

13. An induction system as set forth in claim 12 wherein the first and second inlet passages have different effective lengths entering into the respective plenum chamber.

14. An induction system as set forth in claim 9 wherein the first and second inlet passages have different effective lengths entering into the respective plenum chamber.

* * * * *